United States Patent [19]

Bulpitt et al.

[11] Patent Number: 5,028,134
[45] Date of Patent: Jul. 2, 1991

[54] DEPOLARIZER FOR LIGHT MEASURING INSTRUMENTS

[75] Inventors: Thomas H. Bulpitt, Chatsworth; Nicos P. Skouras, S. Pasadena, both of Calif.

[73] Assignee: Kollmorgen Instruments, Simsbury, Conn.

[21] Appl. No.: 528,722

[22] Filed: May 24, 1990

[51] Int. Cl.⁵ .............................. G01J 3/18; G01J 3/02
[52] U.S. Cl. ...................................... 356/328; 350/370; 356/334
[58] Field of Search ............... 356/300, 301, 317, 318, 356/326, 328, 364–367, 331–334; 350/370, 400

[56] References Cited

U.S. PATENT DOCUMENTS 4,699,512  10/1987  Koshi ................................. 356/366

OTHER PUBLICATIONS

Billings, *Journal of the Optical Society of America*, vol. 41, Dec. 1951, pp. 966–975.

Hughes, *Review of Scientific Instruments*, vol. 31, 1960, pp. 1156–1157.

Rahn et al., *Applied Spectroscopy*, vol. 25, No. 6, 1971, pp. 675–677.

*Primary Examiner*—F. L. Evans
*Attorney, Agent, or Firm*—Poms, Smith, Lande & Rose

[57] ABSTRACT

Light measuring instruments have a sensitivity to polarization states of the light being measured. To minimize such sensitivity a depolarizer is used. The depolarizer includes a half wave polarization plate between the source of light being measured and the light measuring instrument or within the instrument, but ahead of the polarizing elements. The half wave plate is rotated through an angular sector of at least 90° ($\pi/2$ radians) for each measurement period to ensure that all polarization states are measured. If the measurement period is sufficiently long, its half wave plate may be rotated asynchronously with respect to the measurement period through at least two and one-half revolutions.

5 Claims, 1 Drawing Sheet

DEPOLARIZER FOR LIGHT MEASURING INSTRUMENTS

BACKGROUND OF THE INVENTION

The present invention relates generally to optical instruments and measuring apparatus, and more particularly to a novel apparatus to counteract the undersirable effects of polarization preferential orientation in such instruments and apparatus.

DESCRIPTION OF THE RELATED ART

Because of either oblique reflections from optical surfaces or oblique transmission through lenses or other optical elements, many optical instruments preferentially reflect or transmit light waves of specific polarization states. For example, all spectroradiometers exhibit some degree of inherent polarization preference because the optical system must contain one or more prisms or diffraction gratings.

When light measuring instruments, such as photometers, radiometers, spectroradiometers, spectrophotometers, spectro-densitometers, spectrocolorimeters, etc., are used to measure light sources which are completely or partially polarized, any polarization preference of the instrument will interact with the polarization of the light source to produce significant measurement errors. There are five categories of devices that have been used in the past to conteract the effects of polarization preference by generally scrambling the incoming light. These devices include diffusers, integrating spheres, light pipes, depolarizing crystals and half wave retarder plates.

Optical diffusers have often been used to scramble the polarization states of the incoming light. A typical diffuser is ground glass or opal glass. When light hits the surface of the glass it is scattered. Such diffusers achieve varying degrees of depolarization. However, a significant disadvantage and limitation of optical diffusers is that in order for such a diffuser to work properly, a light loss of up to 99% may be encountered. Ground glass or quartz diffusers do not scramble polarization well enough, while bulk diffusers such as opal glass scramble polarization well but also have extremely poor light transmission.

Integrating spheres will completely randomize incoming light. A typical integrating sphere has a first aperture to allow light into the interior chamber of this sphere and a second aperture to allow the light to exit from the interior chamber of the sphere. As the light reflects and scatters from the inner surface of the sphere, very good scrambling of incoming polarized light is achieved. A significant disadvantage and limitation of the integrating sphere is that it is bulky and results in a severe light loss exceeding 99% in many applications.

Long light pipes or fiber bundles will serve to randomize the the polarization of incoming light by multiple internal reflections off walls of the fiber. Typically, in the optical medium, skew rays will hit walls of the fiber and change states of polarization. Light pipes and fiber bundles perform relatively well in mixing polarization states if a sufficient number of reflections have occurred. A significant disadvantage of fiber bundles is that useable core area relative to bundle area produces an insertion loss of at least 50%. A further disadvantage and limitation of fiber bundles is that they are not entirely polarization free as a result of mechanical and optical asymmetry in production of the fiber.

Depolarizing crystals, such as a "cornu pseudo-depolarizer," have been used to transform polarized light into a continuum of states which mimic the behavior of unpolarized radiation. Generally, a depolarizing crystal mixes the polarization by patterning the polarization of a light beam. Taken in cross section, different areas of the light beam have different polarization. Effectively, the cross section of the beam appears to be a bundle of beams wherein each beam has its own polarization state or rotation. A significant disadvantage and limitation of depolarizing crystals is that such devices are difficult and expensive to obtain in large sizes and they also produce a wavelength dependent nonuniform pattern over the aperture which can result in large periodic measurement errors as a function of wavelength.

A stationary half wave retarder plate fixed partially across the collimated aperture of the instrument or apparatus can serve to produce two axes of polarization and thereby average out the effect of instrumental polarization. In practice, the half wave plate covers about half of the aperture with its axis at 45 degrees to that of the instrumental polarization. The limitation is that the averaging is not good because aperture efficiency and polarization is not uniform across the aperture and may vary with wavelength.

SUMMARY OF THE INVENTION

It is accordingly a primary object of the present invention to provide a novel depolarizer to counteract the undesirable effects of polarization preferential orientation in an optical instrument such that use of the instrument to view or measure polarized light sources does not result in errors.

It is another object of the present invention to provide a depolarizer for optical instruments such as photometers, radiometers, spectroradiometers, spectrophotometers, spectro-densitometers, etc.

Yet another object of the present invention is to provide a depolarizer for an instrument which is capable of determining the distribution of intensities versus the polarization angle of a light source or image.

According to the present invention, the depolarizer for a light measuring instrument includes a half wave polarization plate adapted to be disposed either optically intermediate to the light measuring instrument and a source of light being measured or within the optical system of the light measuring instrument. The invention further includes means for rotating the half wave plate through a selected angle about an axis of rotation normal to the half wave plate during the period the light is being measured. The angle of rotation is selected such that at least one polarization phase cycle of the light occurs during the measurement.

The half wave plate may be rotated in integral multiples of 90° angular sectors ($\pi/2$ radians) or may be continuously free-running. When the half wave plate is rotated through discrete 90° sectors, at least one polarization phase cycle occurs for the duration of the measurement of the light. For longer measurement periods, the half wave plate may be free-running but at least two-and-one-half to five revolutions should be performed so that 10 to 20 polarization phase cycles occur.

A significant advantage of the present invention is that it provides much better light transmission efficiency than most of the prior art devices discussed hereinabove. The light loss of the system is only about 15% compared to up to 99% of the system of the prior art. A further advantage of the present invention is that the invention performs far better than the depolarizing crystal in that it does not produce a nonuniform, wavelength dependent spatial pattern. Yet another advantage of the present invention is that is does not have the deficiencies of the use of the half wave plate of the prior art in that aperture nonuniformities of efficiency and polarization are averaged efficiently.

These and other objects, advantages and features of the present invention will become apparent to those skilled in the art from a study of the following description of the exemplary preferred embodiment of the invention when read in conjunction with the attached drawings and appended claims.

DESCRIPTION OF AN EXEMPLARY PREFERRED EMBODIMENT

Figure 1:
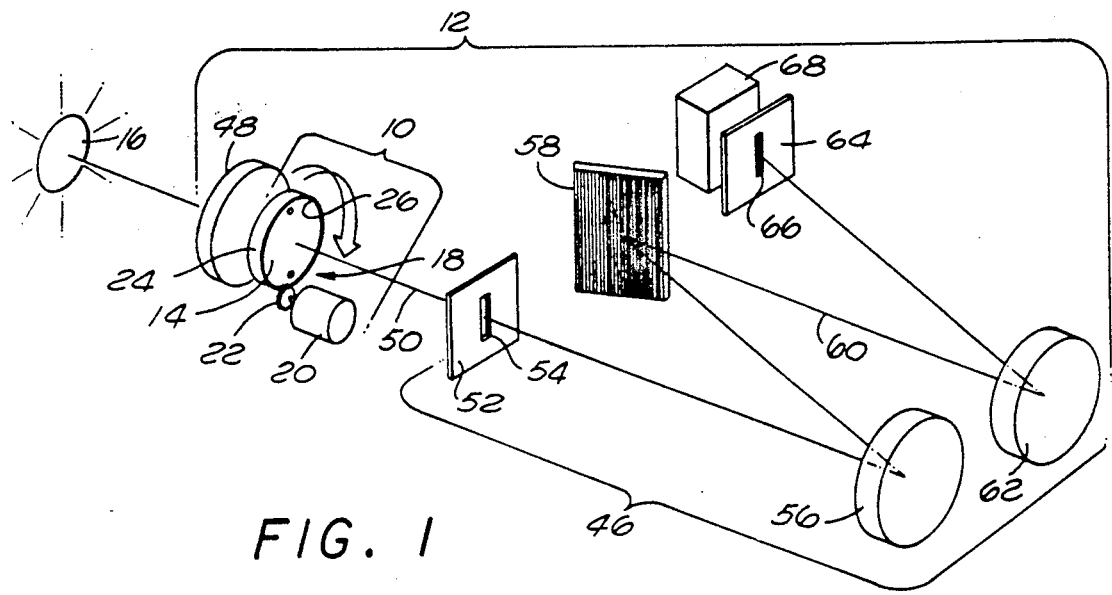
FIG. 1 schematically illustrates a depolarizer constructed in accordance with the principles of the present invention and being exemplarily used in conjunction with a spectroradiometer.

Referring now to FIG. 1, there is shown a depolarizer 10 for a light measuring instrument 12. According to the present invention, the depolarizer 10 includes a half wave plate 14 adapted to be disposed optically intermediate to the light measuring instrument 12 and a source 16 of the light beam being measured. The depolarizer 10 further includes means 18 for rotating the half wave plate 14 through a selected angle about an axis of rotation normal to the half wave plate 14 during a measurement of the light measuring instrument 12. The angle is selected such that at least one polarization phase cycle of the light occurs during the measurement period. A polarization phase cycle is a rotation of 180° ($\pi$ radians) of the incoming polarization.

Rotating means 18, in one embodiment of the present invention, includes a motor 20, a drive gear 22 operatively coupled to the motor 20 and a driven ring gear 24 disposed about a periphery 26 of the half wave plate 14. In one embodiment of the present invention, as best seen in FIG. 1, the half wave plate is disk shaped.

For relatively long measurement periods of the measuring instrument 12, the half wave plate 14 may be rotated asynchronously with respect to the measurement period. In a preferred embodiment of the present invention, at least ten to twenty polarization phase cycles should occur to minimize polarization preferential errors in the instrument 12. Accordingly, the selected angle of rotation of the half wave plate 12 should be at least two-and-one-half to five rotations ($5\pi$ radians to $10\pi$ radians). However, if the measurement period is relatively short, at least one polarization phase cycle should occur. For the relatively short measurement periods, the half wave plate 14 should be rotated through a selected angle which is an integral multiple of 90° ($\pi/2$ radians). A special case exists where the half wave plate 14 is initially in line with a plane of polarization of the light such that only 45° ($\pi/4$ radians) is sufficient when the half wave plate 14 is initially in line with the plane of polarization of the light emitting from source 16.

Figure 2:
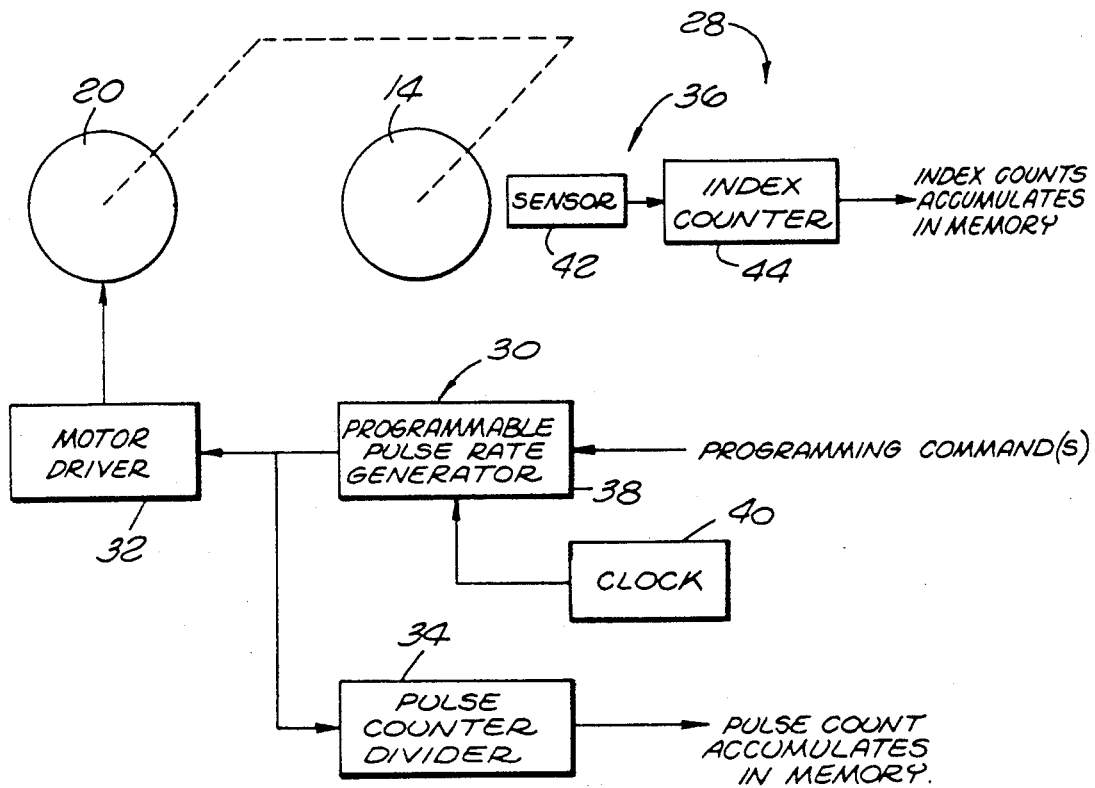
FIG. 2 is a schematic block diagram of an apparatus used to control the rotation of the half wave plate through 90° angular segments as practiced in one embodiment of the present invention.

Referring now to FIG. 2, there is shown a driving means for driving the motor 20 in discrete angular steps. Driving means 28 includes means 30 for generating a pulse string having a programmable number of pulses and a programmable clock period, motor diver means 32 responsive to the pulse string developed by generating means 30 for delivering electrical power to the motor 20 as a function of the number of pulses and the clock period, counter divider means 34 responsive to the pulse string for counting the number of pulses to determine the angular rotation of the motor 20, and means 36 for sensing the angular position of the half wave plate 14 to determine absolute polarization phase cycle data.

The pulse string generating means 30 is programmed to synchronize the polarization phase cycle data and the angular rotation of the plate 14 with the measurement period of the instrument 12. In one embodiment of the present invention, generating means 30 includes the pulse generator 38 responsive to a clock signal developed by a clock 40. The sensing means 36 includes a position sensor 42 disposed proximate to the half wave plate 14 which develops a signal for application to a counter 44. The counter 44 has an index count which accumulates in a memory (not shown) and the counter divider 34 also provides a pulse count for memory. The counts accumulated in the memory are used to generate the programming commands for application to the pulse generator 30 to determine the number of pulses and their time duration.

Referring again to FIG. 1, in one particular embodiment of the present invention, the above-described polarization means 10 is useful in a class of instruments 12 known as a spectroradiometer. Such a spectroradiometer may be based upon a Czerny-Turner, or other type, monochromator (or polychromator) 46.

The light measuring instrument 12 includes an imaging lens 48 adapted to be illuminated from the source 16 of light to develop a convergent light beam. The covergent light beam is then incident on the depolarizing means 10 which develops a resultant convergent light beam 50 to be measured. This convergent light beam 50 is further focused into the monochromator 46. The monochromator 46 further includes a first opaque member 52 having an input aperture 54 through which the resultant beam 50 passes. A first collimator 56, in the form of a collimating mirror, collimates the beam 50 after passing through the input aperture 54 and directs the beam 50 to means 58 for diffracting the beam from the first collimator 56 as a function of the wavelength of the beam to develop a diffracted beam 60. In one embodiment of the present invention, diffracting means 58 may be a plane grating which causes dispersion of light into its different wavelengths.

The diffracted beam 60 is incident upon a second optical element 62 to focus the diffracted beam 60. Again, the second optical element 62 may be in a form of a mirror. A second opaque member 64 having an exit aperture 66 through which the diffracted beam 60 from the second optical element 62 passes. The beam 60 exits through the aperture 66 to be incident on means 68 for measuring the spectral intensity of the diffracted beam 60 passing through the exit aperture 66.

In a preferred embodiment of the present invention, the half wave plate 14 may be constructed from either quartz or mica. Mica is a preferred material for the visible spectrum since in its indices of refraction are nearly constant over this spectral range. Half wave plates known as first order mica retardation plates are commercially available in glass sandwiches in sizes up to 50 millimeters in diameter which cover the spectrum from approximately 400 to 700 nanometers.

It is also contemplated by the present invention that the half wave plate 14 may be replaced by an equivalent structure having a broader spectral range, encompassing all or part of the spectrum from 200 to 3,000 nanometers. This equivalent structure is an achromatic Fresnel rhomb retarder consisting of two quarter wave glass or fused quartz rhomb parallelpipeds placed end-to-end in a V-shaped configuration. This device would work in the same manner as the half wave plate 14 shown in FIG. 1. However, it would require an additional 40 to 100 millimeters of mechanical length in the optical path and a more elaborate mount for the rhomb.

Another class of instrument made possible by this invention is a polarization analyzing radiometer. Such a radiometer would include a fast photodetector, amplifier and read out system, an analyzing polarizer in front of the photodetector and a rotating half wave plate or rhomb which is driven by a motor which also drives an analog digital rotary encoder. Such an instrument would have the half wave plate rotating through 90° in mechanical rotation to sweep throughout polarization orientations of the incoming light. The photodetector in conjunction with the analyzing polarizer will provide an electrical output which is proportional to light intensity at each polarization angle. The amplifier and read out system in conjunction with the rotary encoder then reads out the light intensity at each and every polarization angle.

Accordingly, there has been described above a novel polarizer for optical measuring instruments. Those skilled in the art may now make numerous uses of and modifications to the present invention without departing from the inventive concepts disclosed and described herein. Accordingly, the present invention is due to be defined solely by the scope of the appended claims.

What is claimed is:

1. A depolarizer for a light measuring instrument comprising:
   a half wave plate disposed optically intermediate said instrument and a source of light being measured or within said light measuring instrument and positioned in advance of polarizing elements of said instrument; and
   means including a motor for rotating said plate through a selected angle about an axis of rotation normal to said half wave plate during a measurement period of said instrument, said angle being selected such that at least one polarization phase cycle of said light occurs during said measurement period, said rotating means including means for driving said motor in discrete angular steps;
   said driving means including:
      means for generating a pulse string having a programmable number of pulses and a programmable clock period;
      motor driver means responsive to said pulse string for delivering electrical power to said motor as a function of the number of said pulses and said clock period;
      counter/divider means responsive to said pulse string for counting said number of pulses to determine the number of radians of rotation of said motor; and
      means for sensing the angular position of said half wave plate to determine absolute polarization phase cycle data, said pulse string generating means being programmed to sychronize said polarization phase cycle data and said radians of rotation of said motor with said measurement period.

2. A spectroradiometer comprising:
   an imaging lens adapted to be illuminated from a source of light to develop a convergent light beam;
   means for depolarizing said convergent light beam to develop a resultant light beam to be measured;
   a first opaque member having an input aperture through which said resultant beam passes;
   a first optical element to collimate said resultant beam after passing through said input aperture;
   means for diffracting said resultant beam from said first optical element as a function of wavelength of said beam to develop a diffracted beam;
   a second optical element to focus said diffracted beam;
   a second opaque member having an exit aperture through which said diffracted beam from said second optical element passes; and
   means for measuring spectral intensity of said diffracted beam exiting from said exit aperture;
   said depolarizing means including a half wave polarization plate wherein said resultant beam is incident upon said half wave plate and means for rotating said half wave plate through a selected angle about an axis of rotation normal to said plate during a measurement period of said measuring means wherein said angle is selected such that at least one polarization phase cycle of said light occurs during said measurement;
   said rotating means including a motor, a drive gear operatively coupled to said motor, a driven ring gear in meshing engagement with said drive gear, said ring gear disposed about a periphery of said half wave plate, said half wave plate having a disk shape;
   said rotating means further including means for driving said motor in discrete angular steps;
   said driving means including:
      means for generating a pulse string having a programmable number of pulses and a programmable clock period;
      motor driver means responsive to said pulse string for delivering electrical power to said motor as a function of the number of said pulses and said clock period;
      counter/divider means responsive to said pulse string for counting said number of pulses to determine the angular rotation of said motor; and
      means for sensing the angular position of said half wave plate to determine absolute polarization phase cycle data, said pulse string generating means being programmed to synchronize said polarization phase cycle data and said angular rotation of said motor with said measurement period.

3. An apparatus for developing electrical power for application to a motor operatively coupled to a rotating half wave plate within a depolarizer, said apparatus comprising:
   means for generating a pulse string having a programmable number of pulses and a programmable clock period;

motor driver means responsive to said pulse string for delivering said electric power to said motor as a function of the number of pulses and said clock period;

counter/divider means responsive to said pulse string for counting said number of pulses to determine the radians of rotation of said motor; and means for sensing the angular position of said half wave plate to determine absolute polarization phase cycle data, said pulse generating means being programmed to synchronize said polarization phase cycle data and said radians of rotation on said motor with a measurement period.

4. An apparatus as set forth in claim 3 wherein said pulse string generating means includes:
   a clock to develop a clock signal; and
   a pulse generator responsive to said clock signal and to said phase cycle data to develop said pulse string wherein the number of pulses and said clock period thereof are determined by said phase cycle data and the radians of rotation of said motor.

5. An apparatus as set forth in claim 3 wherein said sensing means includes:
   a position sensor which develops a signal corresponding to the angular position of said half wave plate; and
   a counter to which said signal is applied to develop an index count of the rotation of said half wave plate.

* * * * *